US010237678B2

(12) United States Patent
Giannuzzi

(10) Patent No.: US 10,237,678 B2
(45) Date of Patent: Mar. 19, 2019

(54) HEADSET DEVICES AND METHODS FOR CONTROLLING A HEADSET DEVICE

(71) Applicant: RAZER (ASIA-PACIFIC) PTE. LTD., Singapore (SG)

(72) Inventor: Joseph Mario Giannuzzi, Cedar Park, TX (US)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 15/578,827

(22) PCT Filed: Jun. 3, 2015

(86) PCT No.: PCT/SG2015/050140
§ 371 (c)(1),
(2) Date: Dec. 1, 2017

(87) PCT Pub. No.: WO2016/195589
PCT Pub. Date: Dec. 8, 2016

(65) Prior Publication Data
US 2018/0184226 A1 Jun. 28, 2018

(51) Int. Cl.
G06F 3/16 (2006.01)
H04S 7/00 (2006.01)
(Continued)

(52) U.S. Cl.
CPC .............. H04S 7/304 (2013.01); G06F 3/011 (2013.01); G06F 3/012 (2013.01); G06F 3/167 (2013.01);
(Continued)

(58) Field of Classification Search
CPC .......... H04R 1/403; H04R 5/02; H04R 5/033; H04R 5/04; H04S 2420/01; H04S 7/304; G06F 3/012; G06F 3/011
(Continued)

(56) References Cited

U.S. PATENT DOCUMENTS 5,633,993 A 5/1997 Redmann et al.
5,687,239 A 11/1997 Inanaga et al.
(Continued)

FOREIGN PATENT DOCUMENTS

CN 101185368 A 5/2008
CN 102395098 A 3/2012
(Continued)

OTHER PUBLICATIONS

Home Page for RealSpace 3D Audio, https://realspace3daudio.com/, VisiSonics Corporation, College Park, MD.
(Continued)

Primary Examiner — Disler Paul
(74) Attorney, Agent, or Firm — Polsinelli PC

(57) ABSTRACT

According to various embodiments, a headset device may be provided. The headset device may include: an orientation determination circuit configured to determine an orientation of the headset device; a left emitter array including a first plurality of sound emitters; a right emitter array including a second plurality of sound emitters; and a controller configured to control for each sound emitter of the first plurality of sound emitters and of the second plurality of sound emitters the sound emitted by the respective sound emitter based on the determined orientation.

16 Claims, 5 Drawing Sheets

(51) Int. Cl.
*H04R 5/02* (2006.01)
*G06F 3/01* (2006.01)
*H04R 1/40* (2006.01)
*H04R 5/033* (2006.01)
*H04R 5/04* (2006.01)
*G02B 27/01* (2006.01)

(52) U.S. Cl.
CPC .............. *H04R 1/403* (2013.01); *H04R 5/02* (2013.01); *H04R 5/033* (2013.01); *H04R 5/04* (2013.01); *G02B 27/017* (2013.01); *H04R 2499/15* (2013.01); *H04S 2420/01* (2013.01)

(58) Field of Classification Search
USPC ......... 381/74, 306, 310, 333, 370–371, 387, 381/309
See application file for complete search history.

(56) References Cited

U.S. PATENT DOCUMENTS

| | | |
|---|---|---|
| 7,298,853 B2 | 11/2007 | Norris et al. |
| 8,472,653 B2 | 6/2013 | Kon |
| 8,515,082 B2 | 8/2013 | Breebaart |
| 8,520,871 B2 | 8/2013 | Breebaart et al. |
| 8,520,872 B2 | 8/2013 | Jang et al. |
| 8,724,834 B2 | 5/2014 | Huseth et al. |
| 8,825,187 B1 | 9/2014 | Hamrick et al. |
| 8,831,254 B2 | 9/2014 | Wang |
| 8,872,735 B2 | 10/2014 | Park |
| 8,903,104 B2 | 12/2014 | Norris |
| 8,958,583 B2 | 2/2015 | Hess |
| 2006/0204016 A1 | 9/2006 | Pham et al. |
| 2008/0080733 A1* | 4/2008 | Mei ............. H04R 1/1066 381/379 |
| 2008/0211768 A1 | 9/2008 | Breen et al. |
| 2009/0274317 A1 | 11/2009 | Kahn et al. |
| 2013/0069787 A1 | 3/2013 | Petrou |
| 2013/0216074 A1* | 8/2013 | Kon ............. H04R 5/02 381/310 |
| 2013/0293723 A1 | 11/2013 | Benson et al. |
| 2014/0036127 A1 | 2/2014 | Pong et al. |
| 2014/0362180 A1 | 12/2014 | Bickerstaff et al. |
| 2017/0153866 A1* | 6/2017 | Grinberg ............. G02B 27/017 |
| 2018/0046431 A1* | 2/2018 | Thagadur Shivappa ............. H04S 7/304 |
| 2018/0217382 A1* | 8/2018 | Urbach ............. G02B 27/0172 |

FOREIGN PATENT DOCUMENTS

| | | |
|---|---|---|
| CN | 103535051 A | 1/2014 |
| JP | H05336599 A | 12/1993 |
| KR | 10-1343550 B1 | 12/2013 |
| WO | WO 2013/090100 A1 | 6/2013 |

OTHER PUBLICATIONS

First Examination Report dated Jan. 29, 2018 in related Australian Patent Application No. 2015397085, 5 pages.
Extended European Search Report dated Jun. 15, 2018, 9 pages, for the corresponding European Patent Application No. 15894395.1.
Chinese Office Action dated Jun. 25, 2018, originally in 6 pages (10 total with English translation), for the corresponding Chinese Patent Application No. 201580081737.3.

* cited by examiner

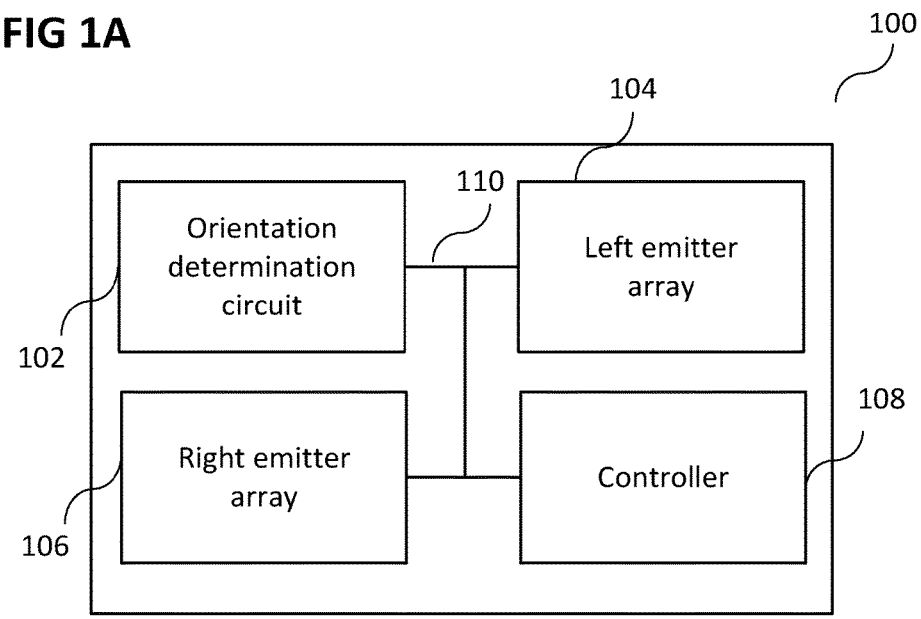
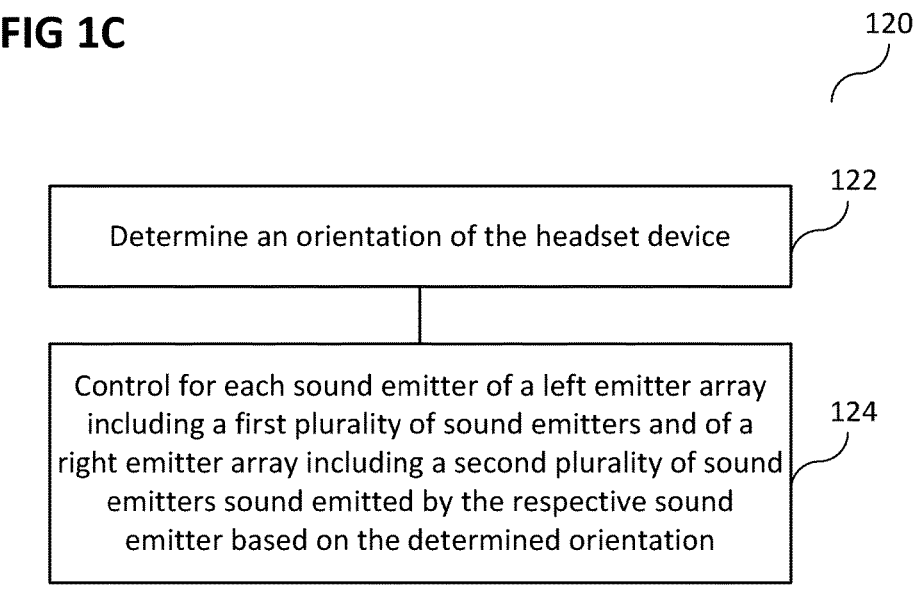

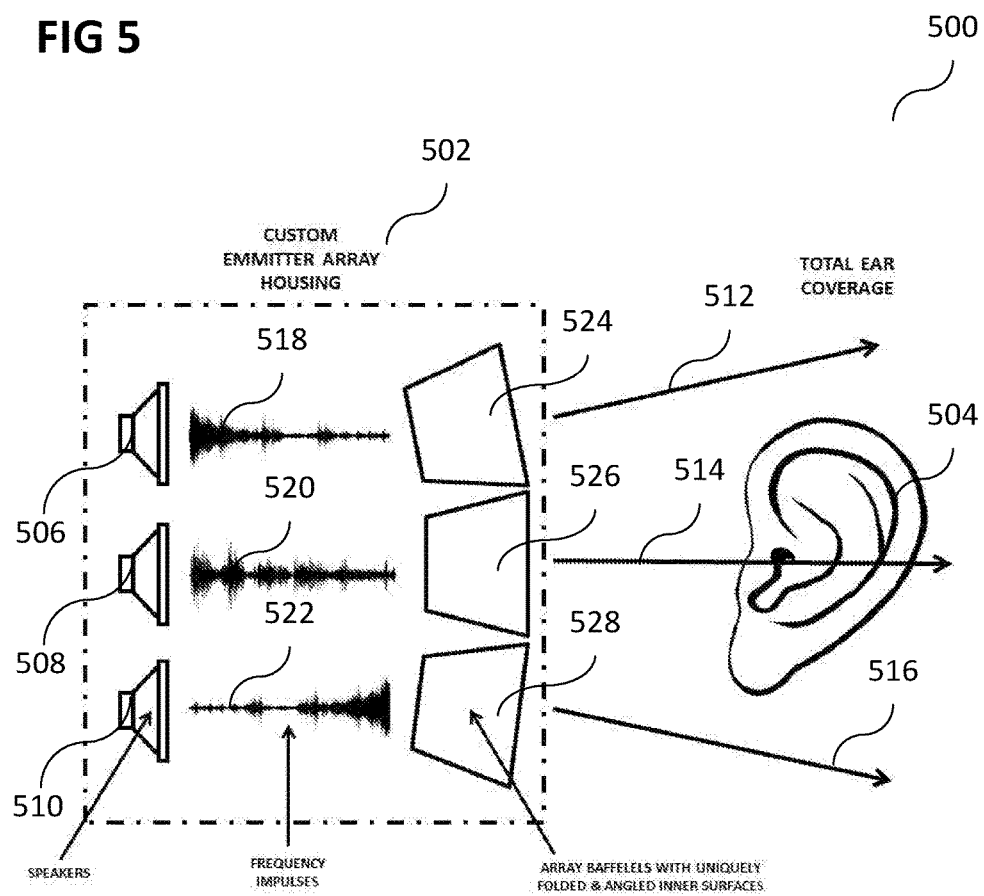

HEADSET DEVICES AND METHODS FOR CONTROLLING A HEADSET DEVICE

TECHNICAL FIELD

Various embodiments generally relate to headset devices and methods for controlling a headset device.

BACKGROUND

Head mounted displays (HMD) and Virtual retinal displays (VRD) may offer very high resolution immersive 3D stereoscopic views of virtual reality environments and 3D games. Commonly used HMDs however do not offer equally immersive, multi-positional 3D audio experiences that are tied to and influenced by the positional nature of the HMD within the virtual reality environment or 3D game. Thus, there may be a need to provide HMDs and VRDs with improved audio experience.

SUMMARY OF THE INVENTION

According to various embodiments, a headset device may be provided. The headset device may include: an orientation determination circuit configured to determine an orientation of the headset device; a left emitter array including a first plurality of sound emitters; a right emitter array including a second plurality of sound emitters; and a controller configured to control for each sound emitter of the first plurality of sound emitters and of the second plurality of sound emitters the sound emitted by the respective sound emitter based on the determined orientation.

According to various embodiments, a method for controlling a headset device may be provided. The method may include: determining an orientation of the headset device; and controlling for each sound emitter of a left emitter array including a first plurality of sound emitters and of a right emitter array including a second plurality of sound emitters sound emitted by the respective sound emitter based on the determined orientation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1A shows a headset device according to various embodiments;

FIG. 1C show a flow diagram illustrating a method for controlling a headset device according to various embodiments;

FIG. 5 shows an illustration of an example of an ultrasonic emitter or psycho-acoustic array according to various embodiments.

DETAILED DESCRIPTION

Figure 1B:
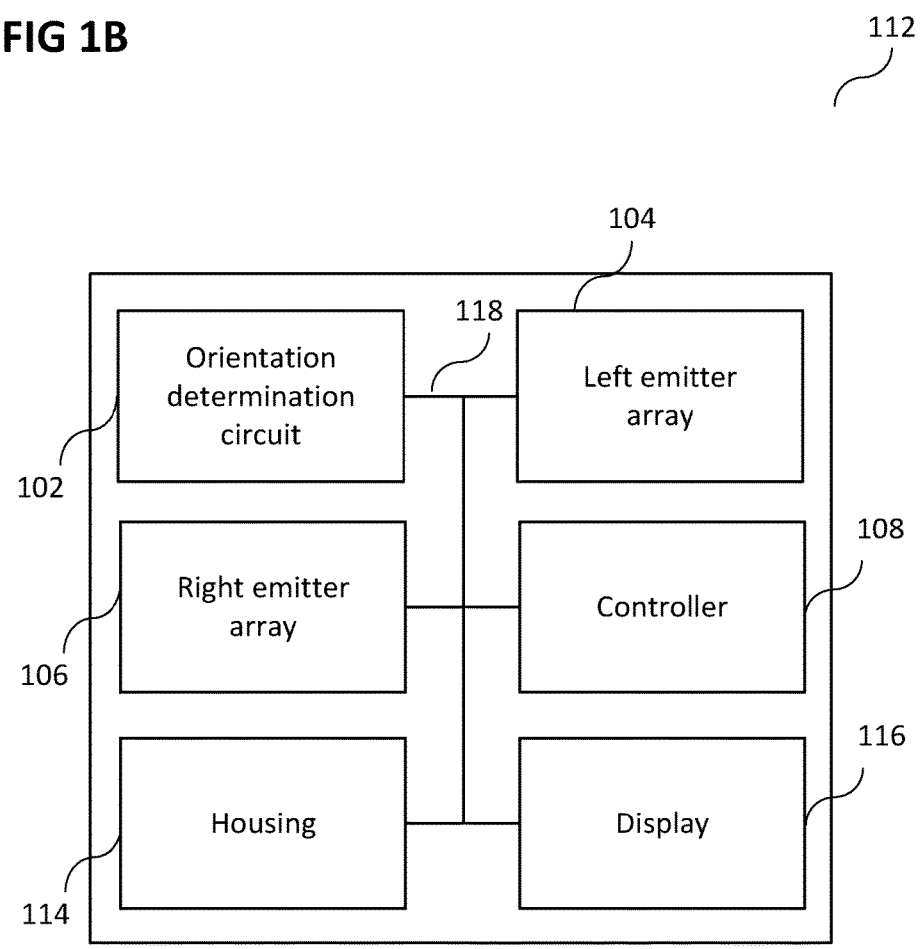
FIG. 1B shows a headset device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the headset device as described in this description may include a memory which is for example used in the processing carried out in the headset device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit and/or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

HMDs (head mounted displays) may offer a very visually immersive experience and employ HD (high definition) screens combined with various lens configuration and other features to approximate real work environments. Some HMDs are based on an open architecture, meaning the user has a real world point of reference, (i.e. the floor or ceiling or both) which grounds the user in the real world to some extent while other designs are based on a "closed" architecture which offers no real world frame of reference. In either example, in commonly used HMDs, the audio experience may not be tied to the visual virtual experience either form positional perspective or at a level that would afford for approximating a real world audio experience with all of nuances that a 3D multi-position audio experience could bring including the influence of elevation based on approximation derived from the positional sensor. A "virtual surround" adaptation of the audio may be applied, however this approach may be limited because it is based on only two hardware drivers in a headphone configuration. The use of a stereo audio source, even a 5.1 or 7.1 audio source, may be extremely limited in particular in trying to replicate or approximate the azimuth or elevation component of a real world audio source/s as it interacts with a given environment/room or how this might be encoded within meta data in a 3D game.

Commonly used 3D audio solutions are not fundamentally integrated into an HMD to complement the visual experience, and therefore the overall virtual reality or 3D gaming experience may be less immersive and does not approximate the real world.

Furthermore, designs of commonly used HMDs may occlude the view to the user's surrounding. The user may have no frame of reference to real world or reference or the specific environment in which they are using the HMD. While the user can still hear, the user is listening to the sounds that are in the environment in which they are using the HMD. This may lead to and/or further complicate the issue of disorientation or a negative OKCR (Opto-Kinetic Cervical Reflex And Frame Of Reference) response. The OKCR response may generally be described as an interrelationship between the sense of sight and the sense of motion when in an artificial environment and when wearing a closed head mounted display. This in some cases may be very severe and users have fallen as a result. In order for the HMD to become truly usable and widely adopted in the CE (Consumer Electronics) market place, this particular problem may be desired to be addressed.

Head mounted displays (HMD) and Virtual retinal displays (VRD) may offer very high resolution immersive 3D stereoscopic views of virtual reality environments and 3D games. Commonly used HMDs however do not offer equally immersive, multi-positional 3D audio experiences that are tied to and influenced by the positional nature of the HMD within the virtual reality environment or 3D game. According to various embodiments, HMDs and VRDs with improved audio experience may be provided.

According to various embodiments, HMDs that are based on the "close" architecture design point may be provided.

According to various embodiments, a multipositional 3D (three-dimensional) audio solution for HMD may be provided.

FIG. 1A shows a headset device 100 according to various embodiments. The headset device 100 may include an orientation determination circuit 102 configured to determine an orientation of the headset device 100. The headset device 100 may further include a left emitter array 104 including a first plurality of sound emitters. The headset device 100 may further include a right emitter array 106 including a second plurality of sound emitters. The headset device 100 may further include a controller 108 configured to control for each sound emitter of the first plurality of sound emitters and of the second plurality of sound emitters the sound emitted by the respective sound emitter based on the determined orientation. The orientation determination circuit 102, the left emitter array 104, the right emitter array 106, and the controller 108 may be coupled with each other, like indicated by lines 110, for example electrically coupled, for example using a line or a cable, and/or mechanically coupled.

In other words, a headset device may have a plurality of sound emitters on each of its left side (for example for a user's left ear) and right side (for example for the user's right ear), and may control the sound emitted by each of the sound emitters based on an orientation (for example a spatial orientation) of the headset device (and thus of the user's head).

According to various embodiments, the orientation determination circuit 102 may include an accelerometer.

According to various embodiments, the orientation determination circuit 102 may include a gyroscope.

According to various embodiments, the orientation may include or may be an orientation in at least one of a frontal plane, a median plane, and a horizontal plane.

According to various embodiments, the orientation may include or may be at least one of an azimuth or an elevation.

According to various embodiments, each sound emitter of the left emitter array 104 and the right emitter array 106 may include an ultrasonic sound emitter.

According to various embodiments, each of the left emitter array 104 and the right emitter array 106 may include a psycho acoustic array.

According to various embodiments, each of the left emitter array 104 and the right emitter array 106 may be provided in a front to back orientation.

According to various embodiments, each of the left emitter array 104 and the right emitter array 106 may be configured to provide a sound curtain.

According to various embodiments, the controller 108 may be configured to control at least one of balance, direction, elevation, depth, sound pressure level, or volume (for example of each of the sound emitters).

According to various embodiments, the controller 108 may be configured to control a head related transfer function.

FIG. 1B shows a headset device 112 according to various embodiments. The headset device 112 may, similar to the headset device 100 shown in FIG. 1A, include an orientation determination circuit 102 configured to determine an orientation of the headset device 100. The headset device 112 may, similar to the headset device 100 shown in FIG. 1A, further include a left emitter array 104 including a first plurality of sound emitters. The headset device 112 may, similar to the headset device 100 shown in FIG. 1A, further include a right emitter array 106 including a second plurality of sound emitters. The headset device 112 may, similar to the headset device 100 shown in FIG. 1A, further include a controller 108 configured to control for each sound emitter of the first plurality of sound emitters and of the second plurality of sound emitters the sound emitted by the respective sound emitter based on the determined orientation. The headset device 112 may further include a housing 114. The headset device 112 may further include a display 116. The orientation determination circuit 102, the left emitter array 104, the right emitter array 106, the controller 108, the housing 114, and the display 116 may be coupled with each other, like indicated by lines 118, for example electrically coupled, for example using a line or a cable, and/or mechanically coupled.

According to various embodiments, the left emitter array 104, the right emitter array 106, and the display 116 may be synchronized.

According to various embodiments, the controller 108 may be configured to individually control the sound emitted by each sound emitter of the left emitter array 104 and of the right emitter array 106.

FIG. 1C show a flow diagram 120 illustrating a method for controlling a headset device according to various embodiments. In 122, an orientation of the headset device may be determined. In 124, for each sound emitter of a left emitter array including a first plurality of sound emitters and of a right emitter array including a second plurality of sound emitters, sound emitted by the respective sound emitter may be controlled based on the determined orientation According to various embodiments, the orientation may be determined using an accelerometer or a sensor fusion package consisting of a number of sensor types.

According to various embodiments, the orientation may be determined using a gyroscope.

According to various embodiments, the orientation may include or may be an orientation in at least one of a frontal plane, a median plane, and a horizontal plane.

According to various embodiments, the orientation may include or may be at least one of an approximated azimuth or an elevation.

According to various embodiments, each sound emitter of the left emitter array and the right emitter array may emit an ultrasonic sound.

According to various embodiments, each of the left emitter array and the right emitter array may include or may be a psycho acoustic array.

According to various embodiments, each of the left emitter array and the right emitter array may be provided in a front to back orientation and possibly in part from a top down orientation.

According to various embodiments, each of the left emitter array and the right emitter array may provide a sound curtain.

According to various embodiments, the method may further include controlling at least one or more of balance, direction, elevation, depth, sound pressure level, or volume.

According to various embodiments, the method may further include controlling a head related transfer function.

According to various embodiments, the headset device may include a custom housing unique to the HMD/headset housing.

According to various embodiments, the headset device may include a display (and thus may be a HMD).

According to various embodiments, the left emitter array, the right emitter array, and the display may be synchronized.

According to various embodiments, the method may further include: individually controlling the sound emitted by each sound emitter of the left emitter array and of the right emitter array.

According to various embodiments, a multi-positional 3D audio solution for head-mounted display ("HMD") applications may be provided. According to various embodiments, immersive, multi-positional 3-dimensional audio experiences may be created that are tied to the positional nature of the HMD within a particular virtual reality environment or 3-dimensional game.

According to various embodiments, a set of ultrasonic emitters may be arranged on each side of a HMD in such a manner that they produce a multi-positional 3-dimensional "sound curtain" around each ear. This may allow the user of the device to achieve the most realistic and immersive experience within the gaming environment.

Humans hear "binauraly" meaning that audio impulses or influences in the open air from multiple directions (like illustrated in FIG. 2) or from the various "hearing planes" strongly influence the listening experience.

Figure 2:
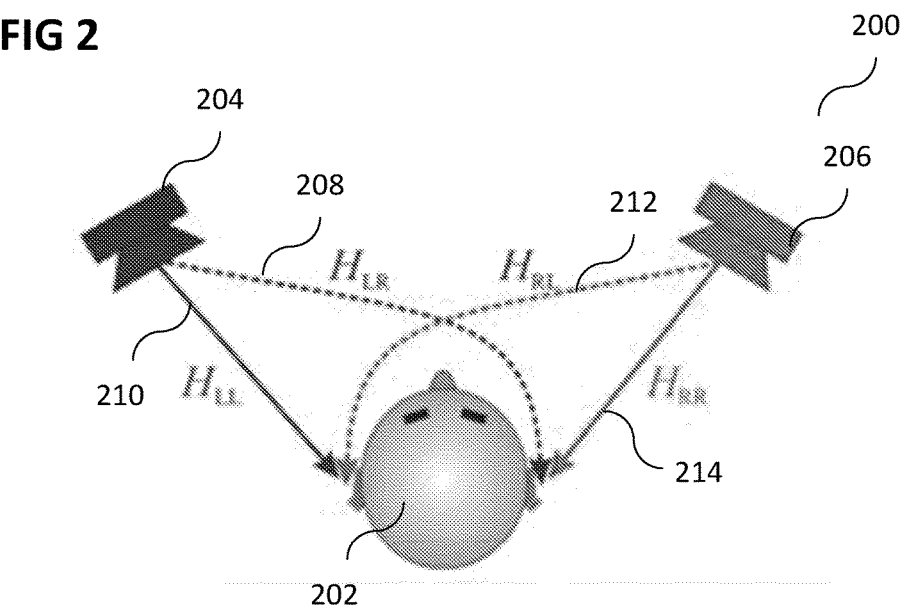
FIG. 2 shows an illustration of an open air binaural hearing model with HRTF (head-related transfer function) influences.

FIG. 2 shows an illustration 200 of an open air binaural hearing model with HRTF (head-related transfer function) influences. A head 202 of a user is illustrated. The user may be able to hear sound originating from a left speaker 204 and a right speaker 206. It will be understood that the index of the HRTFs may indicate the source (for example the left speaker 204 ("L") or the right speaker 206 ("R")) as the first index, and the recipient (for example the left ear ("L") of the user or the right ear ("R") of the user) as the second index. For example, the left ear of the user may receive sound from the left speaker 204 (related to the HRTF $H_{LL}$ 210) and from the right speaker 206 (related to the HRTF $H_{RL}$ 212). For example, the right ear of the user may receive sound from the left speaker 204 (related to the HRTF $H_{LR}$ 208) and from the right speaker 206 (related to the HRTF $H_{RR}$ 214).

Figure 3:
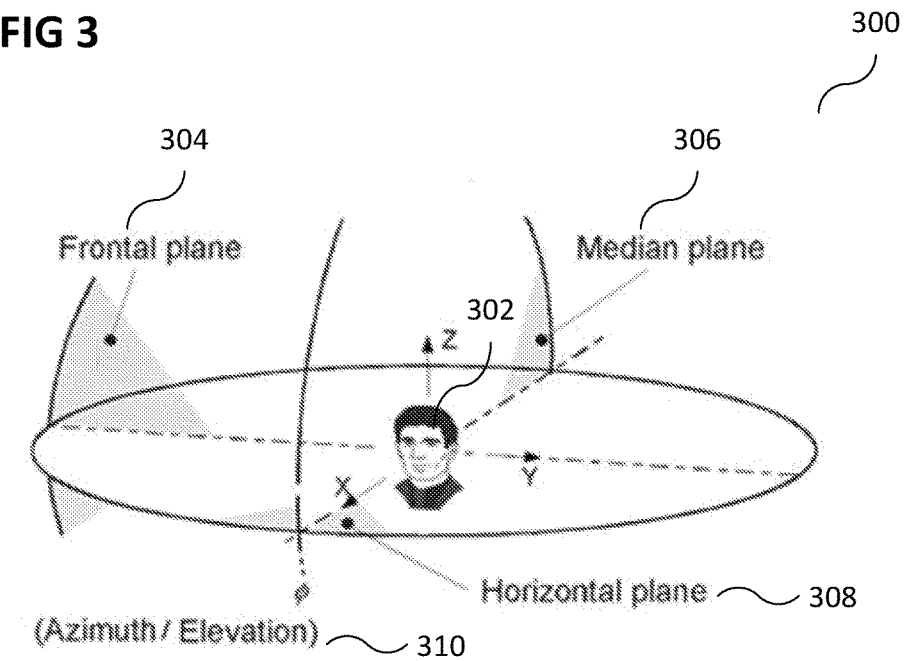
FIG. 3 shows an illustration of open air hearing planes and an elevation element.

FIG. 3 shows an illustration 300 of open air hearing planes and an elevation element. FIG. 3 details the three basic hearing planes (the frontal plane 304, the median plane 306, and the horizontal plane 308) and the additional element of elevation 310. Approximation may be enabled by way of a unique HRTF function which has the elements of a $3^{rd}$ combinational sound source influence. This $3^{rd}$ combinational sound source contains 360 degree directional influences based on the angle above and below the horizontal plane 308 in combination with the rotation and angles from the median plane 306 and frontal plane 308. The degrees of rotation and/or angles may be taken from the head tracking positional sensor in the HMD and as the data changes while the user moves his/her head. This may further enhance the listening experience. Each of the planes 304, 306, 308 and the element of elevation 310 may be relative to a user 302. With unique combinations and tailoring of these parameter, for example in part controlled by software using preset or user defined profiles that are also intrinsically tied to the head position 302 as reported by the HMD, a more real world listening experience may be provided in a "hybrid" open air environment stimulated by a ultrasonic emitter or psyko-acoustic array (in other words: psycho-acoustic) array. It will be understood that humans can hear the audio impulses that are impressed or carried on an ultra-sonic array. An ultra-sonic array may emit full range audio, but not to the level of flatness a psyko-acoustic array could. Either array type may be used according to various embodiments.

Within an artificial 3D (three-dimensional) listening environment, the control and ability to alter each of the audio impulses on the different hearing planes 304, 306, 308 and the element of elevation 310 may be essential to more closely approximating a real world audio experience to create a more immersive experience that includes balance, position or directionality, depth and elevation.

Given the inherent nature of ultrasonic audio devices is highly directional, it can be used in a number of different ways to project sound to a specific location within a narrow angle of dispersion. These directional impulses may be redirected by projecting them on to baffles and/or uniquely angled surface within the array housing.

According to various embodiments, a custom designed ultrasonic emitter or psyko-acoustic array (for example one such array per ear) may be arranged within a customized housing that directs the sound impulses directly in the users ears, and may be integrated into an HMD. The stereo ultrasonic emitters or the psyko-acoustic arrays may be arranged on the HMD in a "front to back" orientation, for example like illustrated in FIG. 4 and FIG. 5. The array may be placed in front of the ear, so "front to back" and may also have a portion of the array over the ear to allow and provide for that element of elevation which would be based on some level of approximation in combination with custom HRTF algorithms.

Figure 4:
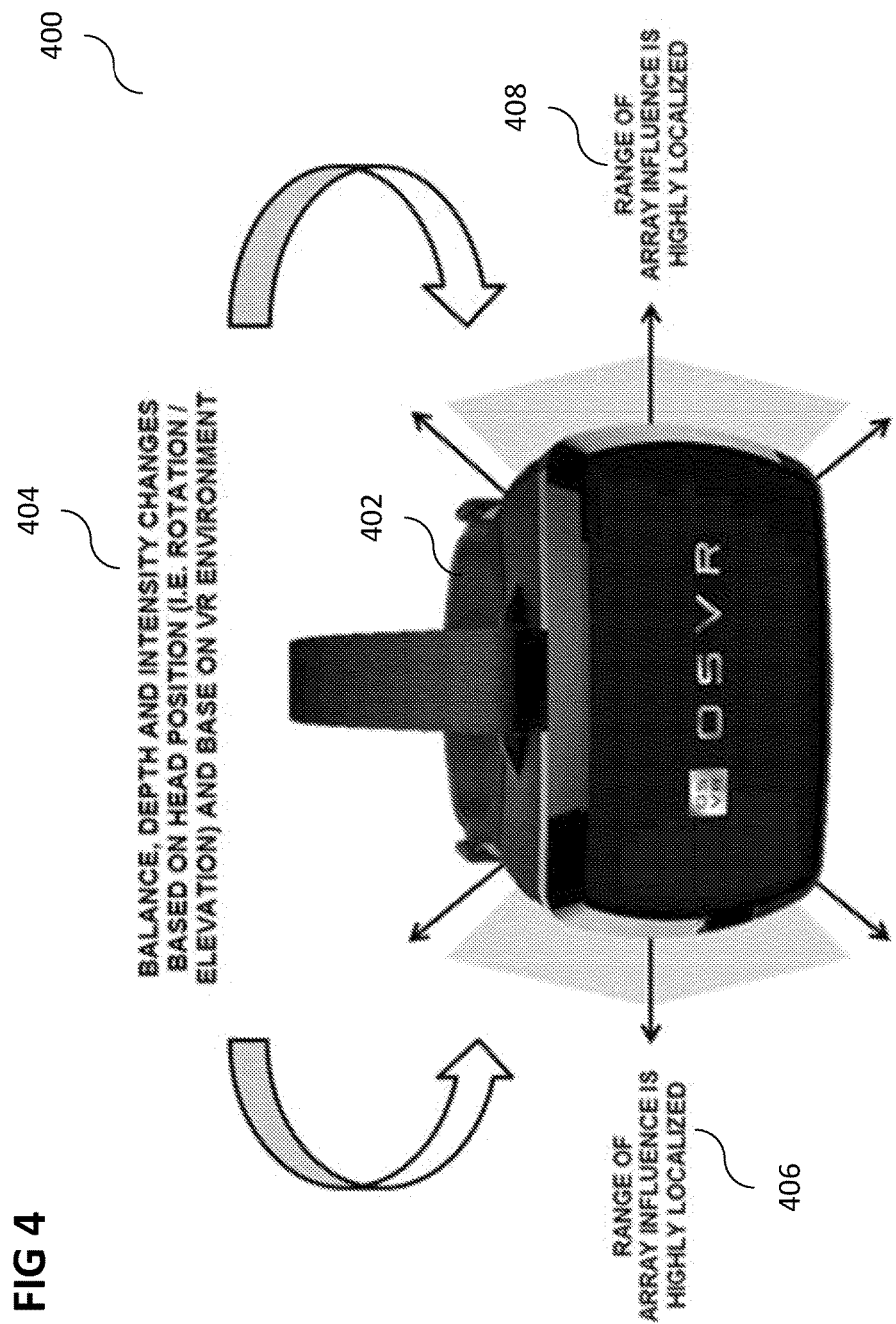
FIG. 4 shows an illustration of ultrasonic emitters or a psycho-acoustic array according to various embodiments.

FIG. 4 shows an illustration 400 of ultrasonic emitters or a psyko-acoustic array according to various embodiments attached to each side of a head mounted display 402 (HMD). Like illustrated by 404, balance, depth, and intensity may change based on the head position (for example rotation and/or elevation) and based on the VR (virtual reality) environment. According to various embodiments, the range of array influence may be highly localized (like illustrated by 408 for the left ear, and by 406 for the right ear).

FIG. 5 shows an illustration 500 of an example of an ultrasonic emitter or psycho-acoustic array (provided in an emitter array housing 502) according to various embodiments. An ear 504 of a user of the psycho-acoustic array 502 is shown. The psycho-acoustic array 502 may include a plurality of speakers, for example a first speaker 506, a second speaker 508, and a third speaker 510. The first speaker 506 may emit first frequency impulses 518, which may be reflected in first baffles 524 of an array of baffles, so that the frequency impulses, after leaving the first baffles 522 have a first main direction 512 of sound emittance. The second speaker 508 may emit second frequency impulses 520, which may be reflected in second baffles 526 of the array of baffles, so that the frequency impulses, after leaving the second baffles 526 have a second main direction 514 of sound emittance. The third speaker 510 may emit third frequency impulses 522, which may be reflected in third baffles 528 of the array of baffles, so that the frequency impulses, after leaving the third baffles 528 have a third main direction 516 of sound emittance. Together, the plurality of sound emitters of the psycho-acoustic array 502 may cover the entire ear 504 of the user. The actual physical dimensions and parameters of the baffles and/or of the speaker may be unique and may apply to only one specific design of an HMD and/or headset.

According to various embodiments, a controller (for example using software) may be aware of the head position, and may produce a multi positional 3D sound curtain around each ear. It will be understood that the "sound curtain" may be the coverage over the ear/s, in a psyko-acoustic array this may be accomplished by way of designing and incorporating angled and nested angled surfaces within the array that is some instanced delay the some frequencies to the ear and that direct the sound to and over the ear. As described above the array may be constructed in a way that provides for coverage not just in front of the ear but to some degree over the ear. The later may aide in creating a sense of elevation for further directionality of the sound creating a deeper 3D effect.

This sound curtain may include elements of balance, direction, elevation, depth and SPL (Sound Pressure Level) or volume providing for a multi-positional 3D audio experience. Each of the afore-mentioned elements and other custom elements may be altered programmatically and tailored to maximize the 3D affect and to achieve the most immersive virtual reality or 3D gaming experience. The various afore-mentioned elements may be interlinked to some degree, for example SPL, when elevated, may give the sense of the sound being closer while when lower it would give the listener a sense that the sound if farther away. Applying a predetermined amount of balance from right to left in combination with SPL may give a greater sense of directionality. This may be tied in with elevation approximation where the head tracking provides an angle of elevation which may then be extrapolated into the physical height of were the sound is coming from which may be tied to the portion of the array that may sit above each ear would give that additional level of 3D and positional aspect to the sound. It may come down to the unique mixing of these elements. This may be done (almost) in real time and may require tailoring of SW (software)/code at the DSP (digital signal processor)/algorithmic level.

The arrays, and for example its housing may be custom designed to meet the specific mechanical and physical requirements of the HMD. For example, the arrays may be designed to project the sound into the ear in a way that may allow for a full rich 3D audio experience. This hardware aspect according to various embodiments may be combined with custom HRTF functions to further enrich the 3D audio experience. The custom HRTF function/s may be influenced by the hearing planes like described above, for example the directionality of the audio influences and the element of elevation and how they all interrelate to the physical aspects of the virtual environment or the 3D game environment conveyed through meta data.

According to various embodiments, a custom designed stereo ultrasonic array may be provided; one per ear along with a custom design housing that is tailored to the physical design parameters of a particular HMD. The arrays and specifically the housing of the arrays may be constructed in such a way as to direct the audio impulses by way of fold, baffles and or other unique surface details designed to achieve the best possible audio results impressed onto each ear. It will be understood that the "housing" may refer to the physical enclosure that the audio array element may be integrated into. The array housing may be somewhat nondescript externally however internally it may be comprised of uniquely angled and nested angled surfaces which may separate the various aspects of the frequencies and harmonics involved to provide for the positional and 3D effect. The internal structure of the array may be unique and specific to the device it is attached to. It may not necessarily work at all or to a great degree if attached to another device. The stereo ultrasonic or psyko-acoustics arrays may work in combination with control software that may allow for direct user controlled or through specific preset "profiles" stored in a cloud based model for selection and use for a particular VR environment or 3D game.

According to various embodiments, devices and methods may be provided which provide an immersive, software controllable multi-positional 3D audio experience to an HMD platform.

According to various embodiments, devices and methods may be provided for ultrasonic multi-positional 3D audio for HMDs.

According to various embodiments, devices and methods may be provided for a multi-positional 3D audio solution using custom HRTF & elevation approximation based on the HMD's head tracking positional sensor data for HMD applications.

According to various embodiments, devices and methods may be provided that use ultrasonic emitters or a psycho-acoustic array enclosed in a custom housing specifically designed for HMD applications. According to various embodiments, the emitters may be influenced by software that is tied to the positional aspect of the head position, (i.e. rotation and/or elevation) as reported by the HMD to produce a multi-positional 3D audio experience.

The following examples pertain to further embodiments.

Example 1 is a headset device comprising: an orientation determination circuit configured to determine an orientation of the headset device; a left emitter array comprising a first plurality of sound emitters; a right emitter array comprising a second plurality of sound emitters; and a controller configured to control for each sound emitter of the first plurality of sound emitters and of the second plurality of sound emitters the sound emitted by the respective sound emitter based on the determined orientation.

In example 2, the subject-matter of example 1 can optionally include that the orientation determination circuit comprises an accelerometer.

In example 3, the subject-matter of any one of examples 1 to 2 can optionally include that the orientation determination circuit comprises a gyroscope.

In example 4, the subject-matter of any one of examples 1 to 3 can optionally include that the orientation comprises an orientation in at least one of a frontal plane, a median plane, and a horizontal plane.

In example 5, the subject-matter of any one of examples 1 to 4 can optionally include that the orientation comprises at least one of an azimuth or an elevation.

In example 6, the subject-matter of any one of examples 1 to 5 can optionally include that each sound emitter of the left emitter array and the right emitter array comprises an ultrasonic sound emitter.

In example 7, the subject-matter of any one of examples 1 to 6 can optionally include that each of the left emitter array and the right emitter array comprises a psycho acoustic array.

In example 8, the subject-matter of any one of examples 1 to 7 can optionally include that each of the left emitter array and the right emitter array is provided in a front to back orientation.

In example 9, the subject-matter of any one of examples 1 to 8 can optionally include that each of the left emitter array and the right emitter array is configured to provide a sound curtain.

In example 10, the subject-matter of any one of examples 1 to 9 can optionally include that the controller is configured to control at least one of balance, direction, elevation, depth, sound pressure level, or volume.

In example 11, the subject-matter of any one of examples 1 to 10 can optionally include that the controller is configured to control a head related transfer function.

In example 12, the subject-matter of any one of examples 1 to 11 can optionally include a housing.

In example 13, the subject-matter of any one of examples 1 to 12 can optionally include a display.

In example 14, the subject-matter of any one of examples 1 to 13 can optionally include that the left emitter array, the right emitter array, and the display are synchronized.

In example 15, the subject-matter of any one of examples 1 to 14 can optionally include that the controller is configured to individually control the sound emitted by each sound emitter of the left emitter array and of the right emitter array.

Example 16 is a method for controlling a headset device, the method comprising: determining an orientation of the headset device; and controlling for each sound emitter of a left emitter array comprising a first plurality of sound emitters and of a right emitter array comprising a second plurality of sound emitters sound emitted by the respective sound emitter based on the determined orientation.

In example 17, the subject-matter of examples 16 can optionally include that the orientation is determined using an accelerometer.

In example 18, the subject-matter of any one of examples 16 to 17 can optionally include that the orientation is determined using a gyroscope.

In example 19, the subject-matter of any one of examples 16 to 18 can optionally include that the orientation comprises an orientation in at least one of a frontal plane, a median plane, and a horizontal plane.

In example 20, the subject-matter of any one of examples 16 to 19 can optionally include that the orientation comprises at least one of an azimuth or an elevation.

In example 21, the subject-matter of any one of examples 16 to 20 can optionally include that each sound emitter of the left emitter array and the right emitter array emits an ultrasonic sound.

In example 22, the subject-matter of any one of examples 16 to 21 can optionally include that each of the left emitter array and the right emitter array comprises a psycho acoustic array.

In example 23, the subject-matter of any one of examples 16 to 22 can optionally include that each of the left emitter array and the right emitter array is provided in a front to back orientation.

In example 24, the subject-matter of any one of examples 16 to 23 can optionally include that each of the left emitter array and the right emitter array provides a sound curtain.

In example 25, the subject-matter of any one of examples 16 to 24 can optionally include controlling at least one of balance, direction, elevation, depth, sound pressure level, or volume.

In example 26, the subject-matter of any one of examples 16 to 25 can optionally include controlling a head related transfer function.

In example 27, the subject-matter of any one of examples 16 to 26 can optionally include that the headset device comprises a housing.

In example 28, the subject-matter of any one of examples 16 to 27 can optionally include that the headset device comprises a display.

In example 29, the subject-matter of any one of examples 16 to 28 can optionally include that the left emitter array, the right emitter array, and the display are synchronized.

In example 30, the subject-matter of any one of examples 16 to 29 can optionally include individually controlling the sound emitted by each sound emitter of the left emitter array and of the right emitter array.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A headset device comprising:
a display configured to provide a plurality of views of at least one of a virtual reality environment or a three-dimensional game to a user;
an orientation determination circuit configured to determine an orientation of the headset device;
a left emitter array comprising a first plurality of sound emitters;
a right emitter array comprising a second plurality of sound emitters; and
a controller configured to control for each sound emitter of the first plurality of sound emitters and of the second plurality of sound emitters at least one of elevation, depth, sound pressure level, or a head related transfer function of the sound emitted by the respective sound emitter based on the determined orientation,
wherein the determined orientation corresponds to a positional nature of the headset device within the at least one of the virtual reality environment or the three-dimensional game,
wherein each of the left emitter array and the right emitter array is configured to provide a sound curtain that covers a respective entire ear of a user via at least one baffle, the at least one baffle having at least one angled surface that is configured to direct sound to the respective entire ear.

2. The headset device of claim 1,
wherein the orientation determination circuit comprises at least one of an accelerometer or a gyroscope.

3. The headset device of claim 1,
wherein the orientation comprises an orientation in at least one of a frontal plane, a median plane, and a horizontal plane.

4. The headset device of claim 1,
wherein each of the left emitter array and the right emitter array comprises a psycho acoustic array.

5. The headset device of claim 1,
wherein each of the left emitter array and the right emitter array is provided in a front to back orientation.

6. The headset device of claim 1, further comprising:
a housing.

7. The headset device of claim 1,
wherein the left emitter array, the right emitter array, and the display are synchronized.

8. The headset device of claim 1,
wherein the controller is configured to individually control the sound emitted by each sound emitter of the left emitter array and of the right emitter array.

9. A method for controlling a headset device, the method comprising:
displaying a plurality of views of at least one of a virtual reality environment or a three-dimensional game to a user;
determining an orientation of the headset device; and
controlling for each sound emitter of a left emitter array comprising a first plurality of sound emitters and of a right emitter array comprising a second plurality of sound emitters at least one of elevation, depth, sound pressure level, or a head related transfer function of sound emitted by the respective sound emitter based on the determined orientation,
wherein the determined orientation corresponds to a positional nature of the headset device within the at least one of the virtual reality environment or the three-dimensional game,
wherein each of the left emitter array and the right emitter array is configured to provide a sound curtain that covers a respective entire ear of a user via at least one baffle, the at least one baffle having at least one angled surface that is configured to direct sound to the respective entire ear.

10. The method of claim 9,
wherein the orientation is determined using at least one of an accelerometer or a gyroscope.

11. The method of claim 9,
wherein the orientation comprises an orientation in at least one of a frontal plane, a median plane, and a horizontal plane.

12. The method of claim 9,
wherein each of the left emitter array and the right emitter array comprises a psycho acoustic array.

13. The method of claim 9,
wherein each of the left emitter array and the right emitter array is provided in a front to back orientation.

14. The method of claim 9,
wherein the headset device comprises a housing.

15. The method of claim 9,
wherein the left emitter array, the right emitter array, and the display are synchronized.

16. The method of claim 9, further comprising:
individually controlling the sound emitted by each sound emitter of the left emitter array and of the right emitter array.

* * * * *